*Stiles & Jackman,*
*Stovepipe Shelf,*
*N°. 76,668.    Patented Apr. 14, 1868.*
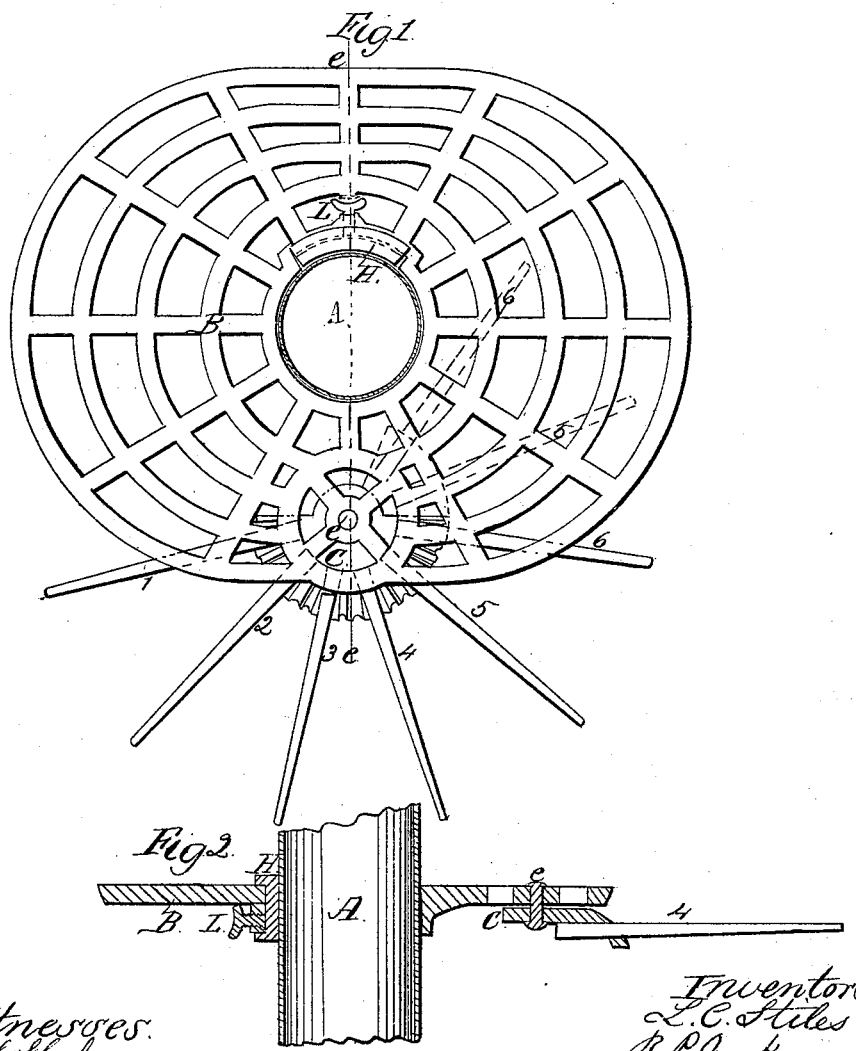

United States Patent Office.

L. C. STILES AND R. P. JACKMAN, OF ELGIN, ILLINOIS.

Letters Patent No. 76,668, dated April 14, 1868.

STOVE-PIPE SHELF.

*The Schedule referred to in these Letters Patent and making part of the same.*

TO ALL WHOM IT MAY CONCERN:

Be it known that we, L. C. STILES and R. P. JACKMAN, of Elgin, in the county of Kane, and State of Illinois, have invented a new and useful Improvement in Fruit and Clothes-Driers; and we do hereby declare the following to be a full and exact description thereof, reference being had to the accompanying drawings, and to the letters of reference marked thereon, making a part of this specification, in which—

Figure 1 is a top or plan view of our improvement.

Figure 2 is a vertical central section of the same on line *e e*.

Similar letters of reference, where they occur in the separate figures, denote like parts in both of the drawings.

Our invention relates to an improvement in that class of driers which is attached to the pipe of a stove, and consists, first, of an elongated disk, so constructed as to be capable of being held at any adjustable height by means of a clasp and set-screw, as will be hereinafter more fully explained; second, in attaching to one or both sides of said disk, a second disk, of a conical shape, and so arranged as to be capable of a rotating movement alternately, and provided with a system of slots or mortises, cut in the rim, for the reception of bars, whereby a cheap and convenient clothes-rack is obtained.

To enable others skilled in the art to construct and use our invention, we will proceed to describe the same with reference to the drawings.

B represents an elongated disk-shaped piece of metal, which may be constructed of a series of bars, extending around and to and from the centre, and united, one to the other, as shown in the drawings, or may be in one solid piece, and provided at its centre with a cavity or opening, which receives pipe A of the stove.

H is a clasp, which is fitted within a circular slot or open space between the pipe and the inner side of the flange around the cavity in disk B. The inner side of said clasp is cut away, or formed in a circular shape, to fit the pipe, and is held against the same by means of a set-screw, L, which passes through the flanges of said disk, and against the outer side of said clasp, whereby said disk may be held at any adjusted height.

Attached to the outer and lower side of said disk B is a second disk, C, (of a dished shape,) which is provided, at its outer side or rim, with a series of slots or mortises, which receive bars, 1, 2, 3, 4, 5, and 6, more or less. Said disk C is so connected to disk B by means of bolt *e*, as to be capable of a rotating movement, thus allowing said bars to be moved back or around, as is sometimes found necessary.

The objects of this arrangement are several: First, by the use of the clasp and set-screw, said disk B may be raised and lowered, or moved around upon the pipe, to bring the same in any convenient position for use; second, by the connection of disk C, we have a cheap and convenient clothes-drier, which can be readily arranged by applying said bars, or removed by withdrawing the same when not in use.

Having thus described the nature and object of our invention, what we claim as new, and desire to secure by Letters Patent, is—

The combination of disk B, clasp H, and set-screw L, together with a rotating disk, C, attached to disk B, all constructed and arranged substantially as and for the purpose described.

In testimony whereof, we have signed our names before two subscribing witnesses.

L. C. STILES,
R. P. JACKMAN.

Witnesses:
N. H. SHERBURNE,
A. T. LEWIS.